United States Patent [19]

Janda

[11] 4,023,279
[45] May 17, 1977

[54] METHOD AND APPARATUS FOR DRYING MOLDABLE RESINS

[75] Inventor: Robert J. Janda, Sterling, Va.

[73] Assignee: Gammaflux, Inc., Reston, Va.

[22] Filed: Aug. 14, 1974

[21] Appl. No.: 497,509

Related U.S. Application Data

[63] Continuation-in-part of Ser. No. 288,941, Sept. 14, 1972, Pat. No. 3,834,038.

[52] U.S. Cl. .................................................. 34/1
[51] Int. Cl.² ........................................... F26B 3/34
[58] Field of Search ... 34/1; 219/10.55 A, 10.55 R; 333/21 A; 264/22, 25, DIG. 65

[56] References Cited

UNITED STATES PATENTS

| 3,233,241 | 2/1966 | Alford | 333/21 A |
| 3,409,447 | 11/1968 | Jeppson | 34/1 |
| 3,471,352 | 10/1969 | Brooke et al. | 264/25 |
| 3,626,838 | 12/1971 | Gorakhpurwalla | 219/10.55 |
| 3,643,054 | 2/1972 | Forster | 219/10.55 |
| 3,771,234 | 11/1973 | Forster | 34/1 |

*Primary Examiner*—John J. Camby
*Assistant Examiner*—Larry I. Schwartz
*Attorney, Agent, or Firm*—Barry J. Nace

[57] ABSTRACT

An improved method and improved apparatus for drying resins which are suitable for being molded through the use of microwave energy and forced hot dry air are disclosed. The improved method and apparatus are particularly useful for drying plastic resins which are to be molded by an injection molding process. A particular embodiment of the improved apparatus showing the advanced improvement is disclosed, as are particularly desirable microwave traps and apparatus for producing the proper microwaves.

11 Claims, 5 Drawing Figures

METHOD AND APPARATUS FOR DRYING MOLDABLE RESINS

CROSS REFERENCE TO RELATED APPLICATIONS

This is a continuation-in-part of co-pending U.S. application Ser. No. 288,941, filed Sept. 14, 1972 now U.S. Pat. No. 3,834,038.

BACKGROUND OF THE INVENTION

1. Field of the Invention

This invention is related to the plastic resins industry and is particularly concerned with a method of drying plastic at a rapid rate so as to more rapidly prepare the plastic resin for use in a molding, particularly injection molding type, process. The invention is more particularly concerned with an improved apparatus for drying moldable resin particles.

2. Prior Art

Heretofore it has been customary to heat plastic resins which are to be used in molding processes by the use of warm air in order to remove moisture from the resins. However, such is time consuming as the plastic must be heated at a carefully chosen rate in order to prevent the plastic resin from melting and thereby becoming undesirable, and in many cases useless, for the molding process. Further, in order to obtain high quality products and prevent corrosion of the apparatus used, it is essential that the moisture within the resinous particles be removed. Accordingly, extensive drying periods wherein moderately low temperatures, i.e., below 250° F are utilized have heretofore been necessary. Typically, many halogenated resins will decompose at high temperatures with the result that gases, e.g., HBr, are released which in turn severely affect the lifetime of the equipment due to their corrosive effect.

U.S. Pat. NO. 3,434,220 to Forster discloses that microwave heating can be used to assist in the removing of moisture from essentially nonpolar polymers in a two-step process using two different wave frequencies, the second being at 2450 mHz, the frequency of water. Forster further indicates that warm air may be used to prevent condensation, with microwave energy.

Today extensive use is made of molded plastic articles such as interiors for automobiles, furniture, novelty items and the like. It is economically necessary, therefore, to make these items as rapidly as possible.

U.S. Ser. No. 288,941, filed Sept. 14, 1972 now U.S. Pat. No. 3,834,038, by Robert J. Janda, discloses that the use of microwave energy alone is not the most optimum method of drying the resin particles, and said application further describes the desirability of using a partial pressure in conjunction with the microwave energy to dry the resin particles.

It is also known in the art that microwave energy may be used for drying purposes. However, the action, or behavior, of microwaves, and the reasons therefor are not entirely understood.

Industry has also developed what is commonly known as a drying hopper for various hygroscopic materials, also referred to in the art as Plenum Drying Hoppers, such as is commercially available from Whitlock Corporation. Such hoppers may be designed in practically any size although the capacity is generally in the range of 50–6,000 pounds. More advance models, such as those manufactured by Whitlock Corporation are in what is known as a "Modular" form wherein certain sections are easily removable and interchanging of components to increase or decrease capacity can be easily achieved.

In fact, the heretofore known methods and the corresponding apparatus do not totally satisfy the industry which is concerned with the drying of plastic resins at a temperature sufficiently low to prevent a melting or decomposition of the resin, in as rapid a time as possible.

3. Objects of the Invention

It is, accordingly, an object of this invention to present a method of drying plastic resins which are to be used in a molding process.

It is more, particularly, an object of this invention to describe a method of drying plastic resins using microwave energy and hot, dry air.

It is further an object of this invention to describe apparatus utilizing microwave energy and hot, dry air in order to more quickly and efficiently dry plastic resins which are to be used in a molding process.

It is a still further object of this invention to describe an improvement in a process for molding plastic resins.

It is yet a further object of this invention to describe an improvement in an apparatus which is used to dry moldable resins in a more efficient manner.

It is a further object of this invention to reduce the oxidation of resins which generally takes place during a molding process.

Other objects of this invention will be obvious to those skilled in the art as the description of this invention proceeds.

BRIEF SUMMARY OF THE INVENTION

The present invention, including both the method and apparatus utilized in the method described, provides a means of removing moisture from plastic resins which are to be molded by the use of microwave energy and hot, dry air in less than 1/10 of the time necessary for drying when well-known conventional methods are used to dry resins. The plastic resins are thereby dried at a rapid rate and the moisture content of the resins is lowered to a percentage which is acceptable to the industry at a fast rate, which thereby enables the molding process to take place faster, and therefore, more economically.

Further, the present invention provides faster drying of the resins, provides a high production rate of drying, reduces the amount of time that the resin must spend within the drier, reduces the necessary physical size of the oven, eliminates the need for a desiccant within the enclave of the drier, (when a dessicant is used portions of the desiccant bed loose its effectiveness after saturation), produces more uniformity in drying, and provides new, improved apparatus for drying moldable resins.

DETAILED DESCRIPTION OF THE INVENTION

By the method of this invention water molecules are "vibrated-out" of plastic resins when the resins are exposed to microwave energy which is tuned to affect only water, and not the plastic resin, and hot, dry air. It is preferable that the particular frequency of the microwaves is in the range of about 2400 to 2500 megahertz and that the temperature of the hot, dry air be in the range of 150° to 300° F and the dew point of the hot, dry air be in the range of about −20° to −40° F.

By using the method of this invention it is possible to increase the molecular temperature of the moisture to as great as about 700° F without causing the resin to melt. Heretofore about 250° F was the highest temperature which could be used when removing moisture from a resin which was to be used in a molding process.

Since plastic resins are essentially transparent to microwave energy and water strongly absorbs radiation, it has been found that surface moisture or water, will quickly heat up to the point where it will diffuse more rapidly through the resin which is also being heated as a result of the microwave interaction with the contained water.

It has been found however, that if the method takes place in a closed container having an atmospheric pressure of one or more that the vaporized moisture is raised in temperature by the microwave energy until the plastic resin melts. It has also been found, as described in U.S. Ser. NO. 288,941, now U.S. Pat. No. 3,834,038, that when a partial vacuum is used the temperature of the plastic resin may be kept below its melting point as a result of the lower vapor pressure and removal of the free vapor before it can be further heated. However, by using hot, dry air with the microwave energy the results obtained in U.S. Ser. No. 288,941 now U.S. Pat. No. 3,834,038 can be improved upon.

It is understood that the method of this invention is directed to removing moisture from any plastic resin which is capable of being molded, especially by an injection molding process. Typically, plastics should only contain moisture as shown in following TABLE 1 wherein heretofore used drying temperatures are shown.

TABLE 1

PERCENTAGE BY WEIGHT OF PERMISSIBLE MOISTURE

| Material | Injection | Extrusion | Drying Temperature |
|---|---|---|---|
| ABS RESIN | .10–.20 | .03–.05 | 170–190° F |
| ACRYLIC | .02–.10 | .02–.04 | 160–180° F |
| CELLULOSICS | Max. .40 | Max. .30 | 150–190° F |
| ETHYL CELLULOSE | .10 | .04 | 170–190° F |
| NYLON | .04–.08 | .02–.06 | 160° F |
| POLYCARBONATE | Max. .02 | .02 | 250° F |
| POLYETHYLENE, Low Density | .05–.10 | .03–.05 | 160–175° F |
| POLYETHYLENE, High Density | .05–.10 | .03–.05 | 160–220° F |
| POLYPROPYLENE | .05 | .03–.10 | 160–200° F |
| POLYSTYRENE | .10 | .04 | 160–180° F |
| VINYL | .08 | .08 | 140–190° F |

However, for purposes of simplicity, reference will be made throughout this disclosure to an "ABS" resin. Such a plastic resin is well-known throughout the industry and is typically used in testing methods for molding resins. The "ABS" resin is a mixture of acrylic, butylenic and styrene resins which is typically commercially available from Marbon Division of Borg-Warner Corp.

Further, the particular particle size is not of significance in the method and apparatus described herein, although generally the particles are 1 or less inches in thickness.

Further, in order to adequately test the method of this invention as electric microwave oven assembled from a Model GD-29 Heathkit was used. The assembled oven had the following specifications:

| | |
|---|---|
| Power Output | 650 watts minimum at 120 volts ac, 60 Hz |
| Power Requirement | 105–125 volts ac, 60 Hz, 15 amperes |
| Frequency | 2450MHz ± 50 MHz |
| Microwave Leakage | 1 mW/cm$^2$ or less |
| Magnetron Tube | Litton Industries, type L-5201 |
| Stirrer | 3 blade, rotates at about 65rpm |
| Interlocks | Door guide microswitch, door latch switch |
| Timer | 0–35 minutes range, split scale 0–5 minutes in one-minute steps 5–35 minutes in five-minute steps |
| Cooling | Forced air |
| Oven Lamp | Fluorescent type F8T5/WW |
| Cooking Space | 7–15/16" high including glass tray 15 1/2" wide 14" deep |
| Outside dimensions | 15 1/8" high 25 1/2" wide 14 3/4" deep (15 13/16" including handle) |
| Weight | 75 lbs. |

It is not intended that the method of this invention is to be in any way limited to the thus described apparatus as other apparatus having the same function can be used in the method and a preferable embodiment will be described herein.

Further, it will be clear to those skilled in the art that the method and apparatus of this invention are useful in molding any well-known resins and not just the conveniently used herein "ABS" resin. Polyethylene, polyvinyl chloride, polybutylenes, polystyrenes, polyvinyl acetates, those set forth in TABLE 1, and the like are typical of the resins which can be more quickly used following the process of this invention.

Figure 1:
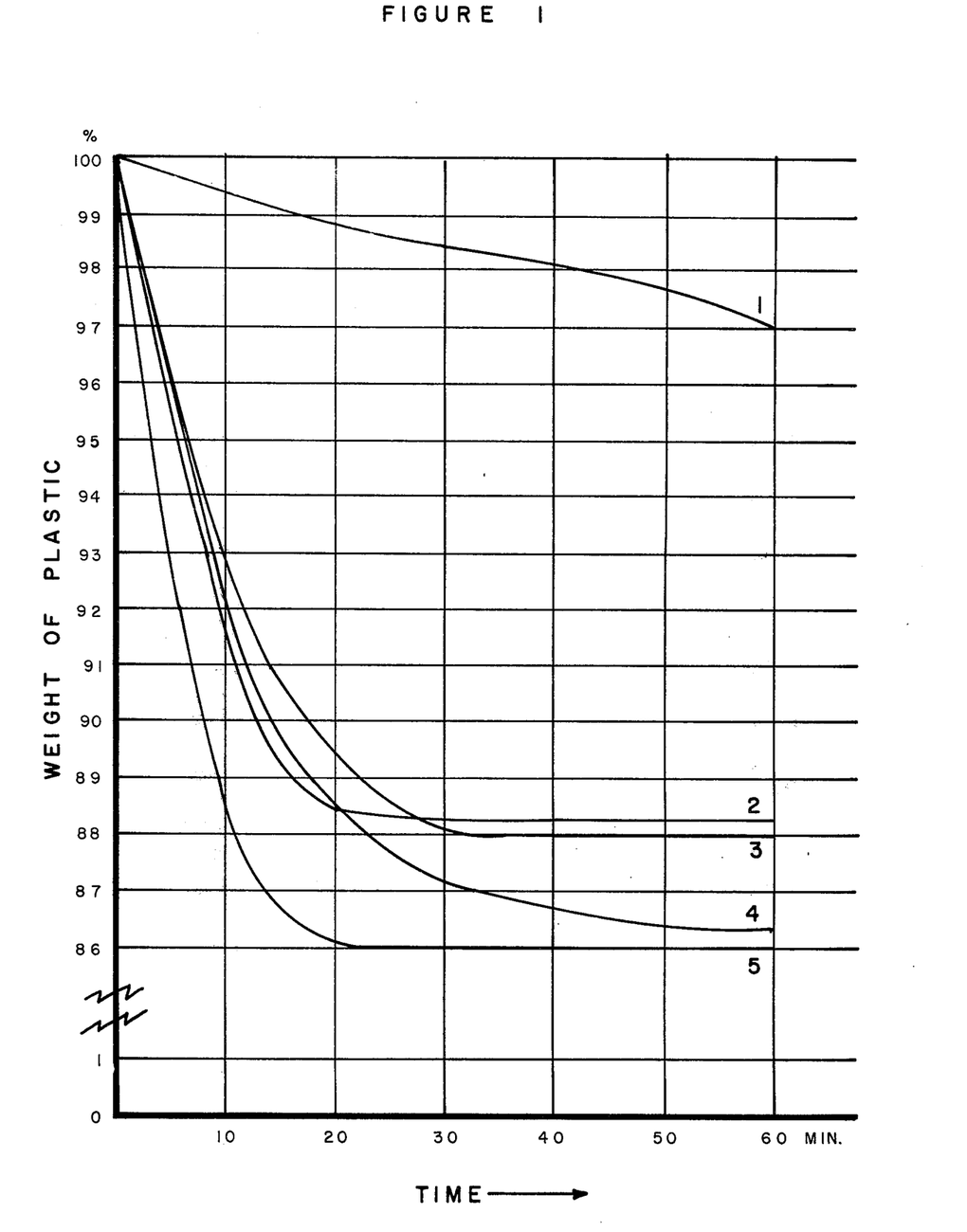
FIG. 1 is a diagram which shows the improvement which is obtained when the method and apparatus of this invention are utilized.

Referring now to FIG. 1, it can be seen that when a conventional oven having a temperature of about 180° F is used to dry an "ABS" resin in 30 minutes the sample has lost 11.6% of its weight as moisture. After 60 minutes no additional moisture has been removed. Slightly better results are obtained when another sample is subjected to microwave energy having a frequency of 2450 ± 50 MHz. When a microwave oven having a frequency of 2450 ± 50 MHz is used with a partial vacuum of about 20 in H$_2$O, improved results are obtained. After only 20 minutes 11.4% of the weight of the resin has been removed as moisture, after 30 minutes 12.7% of the weight of the resin has been removed as moisture, and after 60 minutes 13.5% of the weight of the resin has been removed as moisture. It can also be seen that when only a vacuum was used poor results were obtained. Clearly, the use of microwave energy tuned to affect only the moisture and a partial vacuum produces a more rapid removal of moisture from the plastic resin.

However, it has now been found that even more superior results are obtained using hot, dry air and microwave energy and as shown by FIG. 1, it can be seen that as little as only 1/5 of the time normally necessary need now be consumed by the method of this invention.

As described in co-pending U.S. application, Ser. No. 288,941 now U.S. Pat. No. 3,834,038, the use of the partial vacuum removes surface moisture from the resin and that moisture which is within ("internal") the resin is heated by the microwave energy, diffuses out of the molecule at a rapid rate, and is then removed by the partial vacuum. The use of the microwave energy eliminates the necessity of first heating the plastic externally at a slow rate to prevent melting, and then gradually heating the plastic resin further by conventional methods to thereby heat the internal water. In fact, the microwaves interact directly with the internal moisture in the plastic resin particle approximately 10 times faster than when a conventional dryer is used for the resin and additionally the partial vacuum assists in the rapid removal of moisture which exists or is transferred to the surface of the plastic resin particles. In fact, as shown by FIG. 1, essentially all of the removable moisture is removed in 10 to 25 minutes as opposed to the other shown methods.

Figure 2:
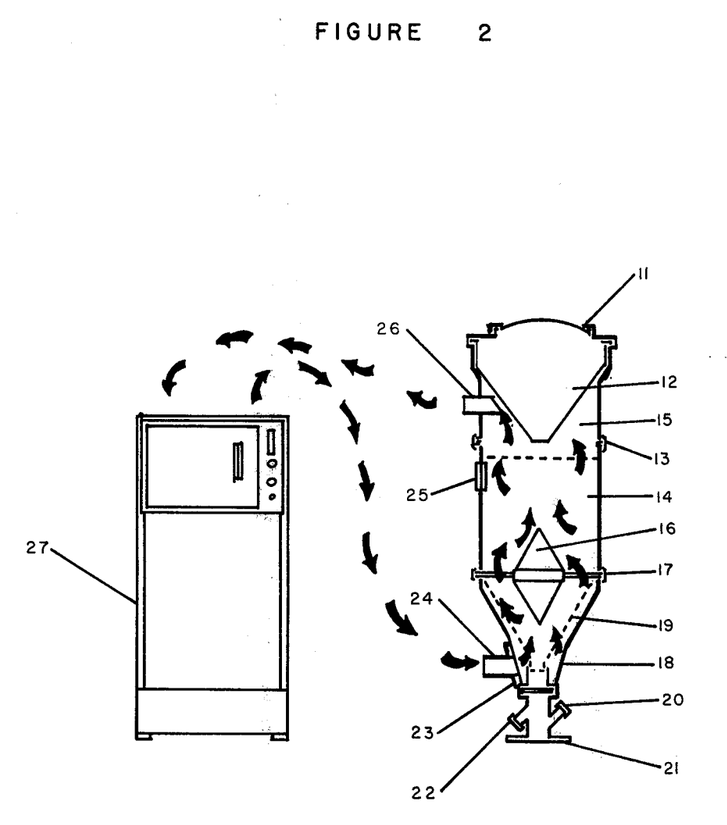
FIG. 2 is a typical piece of apparatus which is a standard in the industry and which is commercially available from Whitlock Corporation.

Referring now to FIG. 2, which depicts a typical dryer for drying hygroscopic materials, such as is commercially available from Whitlock Corporation, e.g., a 400 pound capacity model, the plastic particles which are to be dried enter through a load plate 11 which may have a removable cover or an entrance for the resin particles to enter the dryer body.

An air trap cone 12 forces the air to circulate properly. Hopper swing clamp with gasket, 13 connect the modular sections 14 and 15 (14 being the basic drying section and 15 being the receiving section) while a diverter cone 16 also assists in properly diverting and controlling the flow of the particles to prevent what is commonly referred to as a "wet spot," i.e., an area wherein the plastic particles do not properly dry. Such is due to the fact that the particles fall through the tank faster in the area of the cone 16 thereby having less residence time in the dryer. The cone 16 solves this potential problem. Lower swing clamp 17 connects modular section 14 with modular section 18, which is a "lower outer cone" or dispersing section. A perforated air diffuser cone 19 is optional and may assist in the circulation of the air. Purge inlet 20 is used to direct the flow of the dried particles to a storage area (not shown). Square mounting place 21 is, of course, the supporting means for the dryer. A drain outlet 22 may optionally be present for drainage of any accumulated moisture. Slide gate 23 is merely for performing repairs without losing any of the dried product and is a metal sheet. The hot, dry air enters the drier through portal 24. A sight glass 25 may optionally be provided from which one can view the product within the drier. The hot, dry air exits the dryer through exit portal 26, generally having a temperature of about 150° F and is transported through appropriate connections (not shown) to a dehumidifying dryer 27. The dehumidifying dryer 27 is typically a desiccant bed, e.g., silica gel, a molecular sieve, and the like. The dryer 27 functions to produce a hot, dry air which is characterized as having a dew point of −20° to −40° F and a temperature of about 150° − 300° F, depending on the material being dried. These characteristics of the hot, dry air have been found to be necessary in order to achieve the properly dried final product. It should be understood that the particular type of desiccant bed is unimportant as long and the hot, dry air has the aforementioned characteristics.

Figure 3:
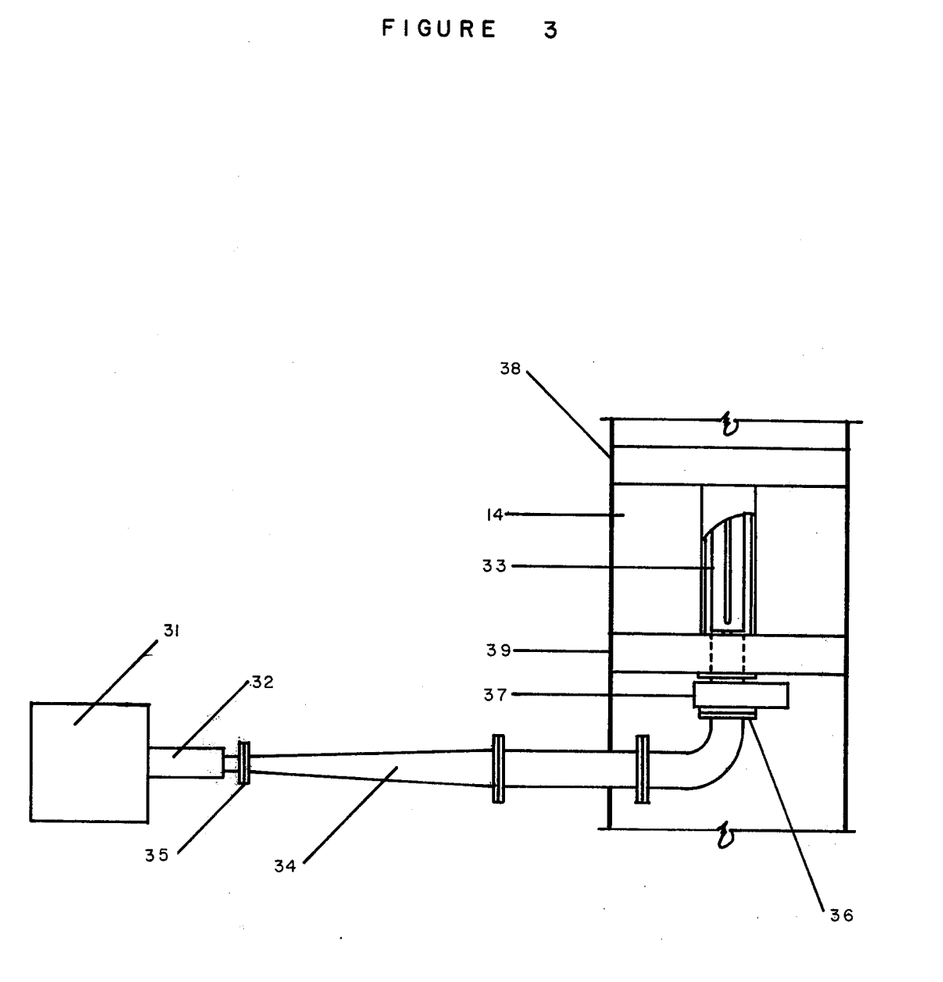
FIG. 3 shows the section of the dryer of FIG. 2 which contains the microwave dryer - hot, dry air section of the apparatus.
Figure 5:
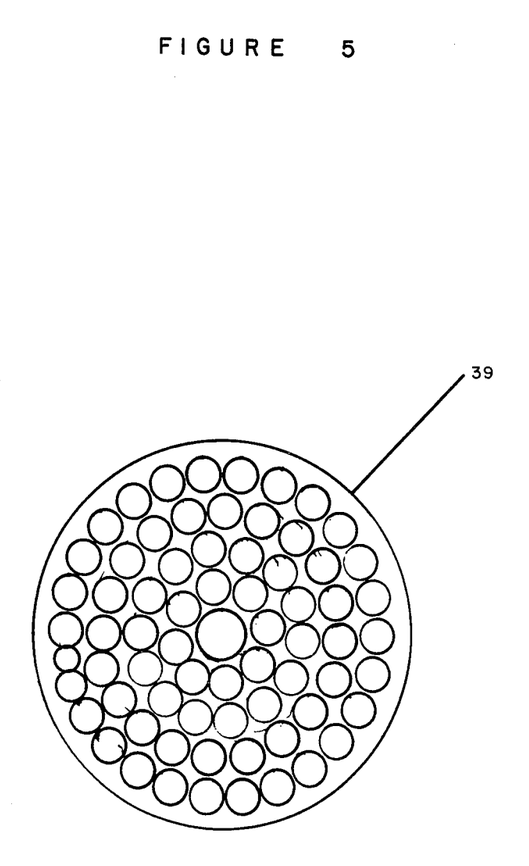
FIG. 5 is a top view of a microwave shield which is used in the subject invention.

Referring now to FIG. 3, it should be realized that such is in fact an adaptation of the modular section 14 of the dryer of FIG. 2, which has been adapted to include the microwave unit. Modular section 14 is that section of the dryer which contains the microwave radiator 33. A microwave source or generator 31 such as has been described heretofore or which is commerically available from Cober Electronics, and which is equipped with an isolator 32 (also commercially available from Cober Electronics) is connected to the microwave radiator 33 through a transaction section 34 and flanges 35 and 36. Radiator motor 37 is the base for the radiator 33 and serves to rotate the radiator at a pre-selected rate of rotation. Microwave traps 38 and 39 serve to prevent the microwaves from escaping from modular section 14, but are designed in such a manner as to permit the plastic particle to enter the said section. While the reasons for the behavior of microwaves are not fully understood, it is understood that there is actually a necessity to, in effect, "confuse" the microwaves whereby they are prevented from escaping a predetermined area. In a specific embodiment of this invention the "traps" are metallic in nature, and are comprised of tubes having a diameter of about 1 inch and being about 4 inches long which permits entrance of the particles but prevents escape of the microwaves. As shown in FIG. 5, looking down at the microwave traps there is seen what appears to be a "grid" which prevents a microwave escape from the modular section 14 and access to said section by the resin particles. Isolator 32 also serves the purpose of preventing a microwave retreat and assists in creating the wave mode. The mode of the wave is important in that the proper mode affects the efficiency of the apparatus. As a result of the function of the isolator 32, a mode is created which is vertical in nature. Transition section 34 then, by virtue of its increased diameter, affects the microwaves in such a manner that the mode becomes essentially horizontal in nature. Transition section 34 in a particular embodiment, has an increased diameter of about 3 inches, greater than that of the isolator 32. This increase in diameter affects the microwaves sufficiently to change the oscillating mode as described heretofore. The thus changed mode is then referred to as being in a "disoriented" state, which aids in the scattering of the microwaves from the radiator 33. Several flanges are necessary to connect the important transition section 34 to the isolator 32 and radiator 33. Also, as shown, the transition section has a curvature at the approach to the radiator motor 37. As a rule, the curvature should be gentle so as not to affect the oscillating mode of the microwaves whereby the pattern of the "disorientation" is not affected.

As the radiator motor 37 turns the radiator 33, the microwaves are emitted uniformly so that all of the internal areas of modular section 14 are equally affected by the rays. The radiator can be made of essentially any metal, e.g., aluminum, copper, and is, of course, sufficiently equipped with holes for suitable emission of the microwaves.

Figure 4:
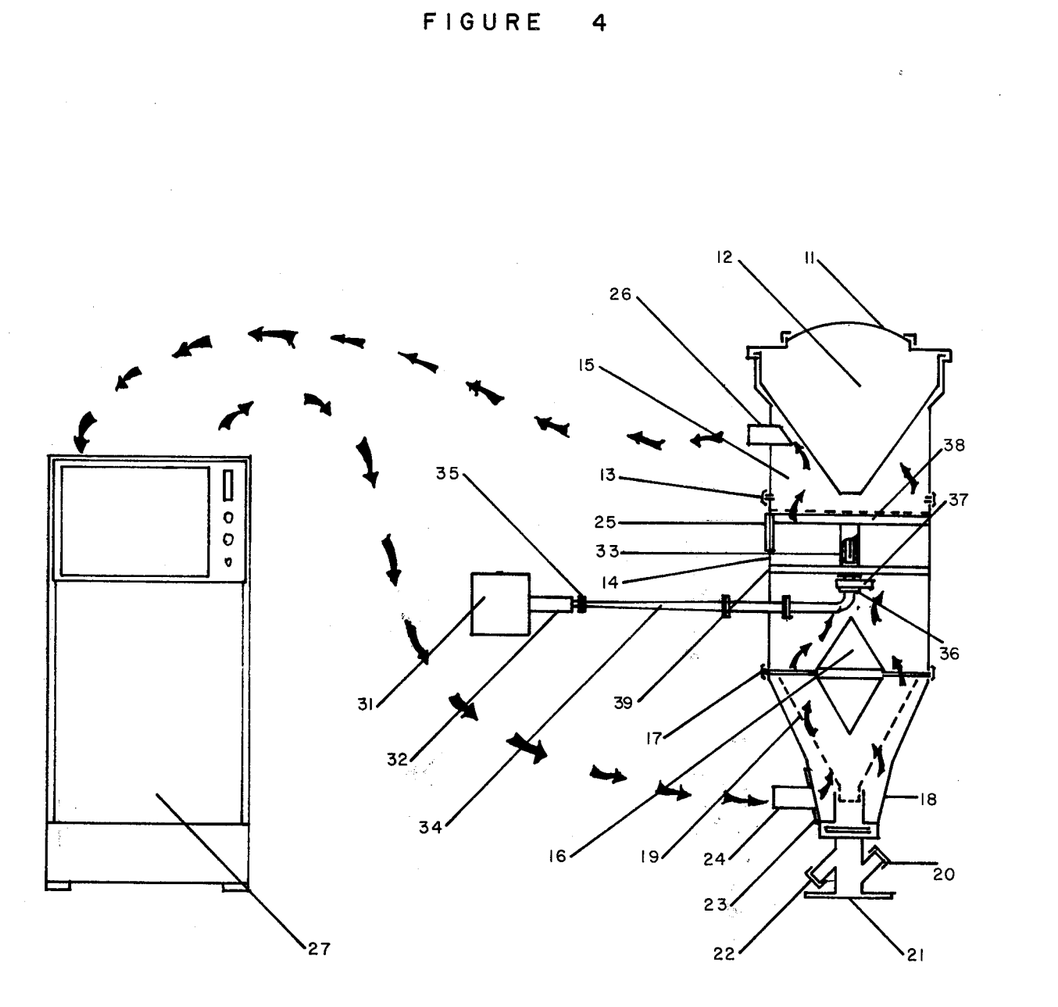
FIG. 4 shows the dryer of FIG. 2 as adapted to contain the advantage of microwave energy and hot, dry air.

FIG. 4 shows the apparatus of FIG. 2 which has been modified by the use of the apparatus depicted in FIG. 3. It will also be noted that as shown, the plastic particles are fed to the load plate 11 in a "batch" process but that as the particles travel through the apparatus, the method becomes "continuous" in nature.

More particularly, the apparatus for drying the moldable resins containing moisture comprises a dryer body having a receiving section 15, a load plate 11, the desirable air trap cone 12, upper swing clamp with gasket 13, drying section 14, a diverter cone 16, a first microwave trap 38, radiator motor 37 and radiator 33, a microwave source 31, isolator 32 and transition section 34, a second microwave trap 39, flanges 35 and 36 dispersing section 18, optional air diffuser cone 19, purge inlet 20, mounting plate 21, drain outlet 22, slide gate 23, portal or hot dry air inlet 24 and exit portal 26, optional sight glass 25, and dehumidifying dryer 27. All have been sufficiently explained heretofore.

It is to be further noted that it has been found that at a temperature of only 68° F (at 1 atm.) 1 kilowatt hour (1 KWH) of power will vaporize approximately 3 lbs. of water. This figure is arrived at by the following calculation:

$$H = H (\Delta T) + Hvp$$

wherein Hvp is the heat of vaporization, H is the heat energy in BTU's and T is the temperature difference between the initial temperature and 212° F.

It is also well known that a resin such as ABS typically contains about 10 pounds of water per 500 pounds of resin. Thus, 1 KWH will remove more than 3 pounds of water from 200 pounds of resin leaving less than about 1 pound of water per 200 pounds of resin or about less than 0.02% moisture in the resin. Such is quite acceptable for resins which are to be used for injection molding.

The following example is set forth only to show the desirability of using the present invention and is in no way intended to be limiting:

EXAMPLE

Five samples of Cycolac, an ABS resin commercially available from the Marbon Division of Borg-Warner Corporation and each weighing 100g and taken from the same stock were tested to ascertain the best method of removing moisture therefrom. Sample 1 was placed in a vacuum at ambient temperatures and the results are set forth in FIG. 1, line 11. Sample 2 was placed in an oven at a temperature of 180° F. The results are shown in FIG. 1, line 12. Sample 3 was placed in a microwave oven as described heretofore and treated with microwave energy of 2450 MHz. The result is shown in FIG. 1, line 13. Sample 4 was placed in a microwave oven as described heretofore which had been adapted as shown in FIG. 3 to provide a partial vacuum. Simultaneous with the use of the microwave energy a partial vacuum was drawn so as to produce a partial vacuum of 20 mmH₂O. The results are set forth in FIG. 1, line 14.

Finally, line 15 of FIG. 1 shows the results of using hot, dry air with the microwave energy to dry the resin and it can be readily seen that the results of this invention are vastly improved over all of the other results.

Clearly the most desirable results were obtained from the method and apparatus of this invention.

It is to be understood that although much of the description heretofore has referred to a particular phlenum dryer which is being improved upon, that any such dryer could be easily adapted to utilize the apparatus of this invention. Similarly, the metal used in the transition section 34 and the radiator 33 is not notable for its substance, e.g., copper, aluminum, alloys thereof, but rather for its ability to prevent escape of the microwaves therefrom. Similarly, the particular material used for the desiccant bed is not notable for its type of material, but rather for its ability to "produce" the hot, dry air which is needed herein. It is also to be noted, of course, that at all times in the method and in the apparatus described herein, the molecular temperature of the moisture within the resin particles, is maintained at a point greater than the melting point of the resin particles, without causing the particles to themselves melt. It will also be understood that the method and apparatus of this invention are particularly useful in a process involving the molding of a resinous article wherein it is desired to dry the resin particles prior to their being molded.

It can therefore be seen that by following the method of the present invention, i.e., using both hot, dry air and microwaves tuned to affect only the water molecules, and using the apparatus described herein that it is possible to remove more moisture at a more rapid rate than was heretofore known to those skilled in the art.

What is claimed:

1. Apparatus for drying moldable resin particles containing moisture which comprises:
  A. a dryer body comprising:
     a. a receiving section for receiving moldable resin particles containing an air exit;
     b. a load plate attached to said receiving section;
     c. a drying section;
     d. a first microwave trap mounted between said receiving section and said dryer section whereby said resin particles enter said drying section and microwaves are retained in said drying section;
     e. a radiator motor;
     f. a radiator mounted atop said radiator motor within said drying section;
     g. a dispersing section containing a hot, dry air inlet and an exit for dispersing said moldable resin particles;
     h. a second microwave trap mounted between said dryer section and said dispersing section whereby said resin particles enter said dispersing section and microwaves are retained in said drying section;
  B. a dehumidifying dryer connected to said hot, dry air inlet and said air exit
  C. a means for supplying microwaves to said dryer body which comprises:
     a. a microwave source;
     b. an isolator connected to said microwave source;
     c. a transition section connected to said isolator and said radiator; and
  D. means for supporting said dryer body.

2. The apparatus according to claim 1 wherein the dryer body is metallic.

3. The apparatus according to claim 1 wherein an air trap cone is mounted in said receiving section of said dryer body.

4. The apparatus according to claim 1 wherein a diverter cone is mounted within said dryer body, whereby said particles are prevented from agglomerating.

5. The apparatus according to claim 1 wherein said dispersing section of said dryer body contains a cone whereby hot, dry air entering said dryer body is diverted to said drying section.

6. The apparatus according to claim 1 wherein said dehumidifying dryer emits hot, dry air having a temperature in the range of about 150° F. to 300° F and dew point in the range of about −20° to −40° F.

7. The apparatus according to claim 1, wherein said transition section has a greater diameter than the diameter of said isolator, whereby the oscillating mode of the microwaves is changed from essentially vertical to essentially horizontal.

8. A process for drying resin particles containing moisture which are one or less inches in thickness, which comprises subjecting said resin particles to microwave energy tuned to a frequency of 2400 to 2500 MHz and hot, dry air having a temperature in the range of 150° − 300° F and a due point in the range of −20° to −40° F for a period of time in the range of 10–60 minutes, whereby the moisture content of said resin particles is reduced to a range of 0.002 to 2.0% by weight of said resin particles.

9. The process according to claim 8 wherein said resin is selected from the group consisting of polyethylene, polyvinyl chloride, polybutylenes, polyvinyl acetates, ABS resins, acrylites, cellulosics, polycarbonates, polystyrenes, ethyl cellulose and nylon.

10. In a process for molding a resinous article wherein said process includes drying resin particles of one or less inches in thickness prior to molding said resin particles, the improvement which comprises drying said resin particles by the use of microwave energy tuned to a frequency of 2400 to 2500 MHz in hot, dry air having a temperature in the range of about 150° to 300° F and a dew point in the range of about −20 to −40° F for a period of time in the range of 10–60 minutes, whereby the moisture content of said resin particles is reduced to a range of 0.002 to 2.0% by weight of said resin particles.

11. The improvement according to claim 10 wherein said resin is selected from the group consisting of polyethylene, polyvinyl chloride, polybutylenes, polyvinyl acetates, ABS resins, acrylites, cellulosics, polycarbonates, polystyrenes, ethyl cellulose and nylon.

* * * * *